[19] United States Patent
Ligman et al.

(10) Patent No.: US 11,316,896 B2
(45) Date of Patent: Apr. 26, 2022

(54) PRIVACY-PRESERVING USER-EXPERIENCE MONITORING (71) Applicant: International Business Machines Corporation, Armonk, NY (US)

(72) Inventors: Joseph W. Ligman, Wilton, CT (US); Marco Pistoia, Amawalk, NY (US); Gegi Thomas, Piermont, NY (US); Stephen P. Wood, Thornwood, NY (US)

(73) Assignee: International Business Machines Corporation, Armonk, NY (US)

(*) Notice: Subject to any disclaimer, the term of this patent is extended or adjusted under 35 U.S.C. 154(b) by 492 days.

(21) Appl. No.: 15/214,849

(22) Filed: Jul. 20, 2016

(65) Prior Publication Data

US 2018/0027019 A1 Jan. 25, 2018

(51) Int. Cl.
H04L 9/40 (2022.01)
H04L 29/06 (2006.01)
G06F 21/62 (2013.01)
G06F 21/54 (2013.01)
H04W 12/02 (2009.01)

(52) U.S. Cl.
CPC .............. H04L 63/20 (2013.01); G06F 21/54 (2013.01); G06F 21/6245 (2013.01); H04W 12/02 (2013.01)

(58) Field of Classification Search
CPC ............... H04L 63/20; G06F 21/6245; G06F 17/3028; G06F 21/54; H04W 12/02
See application file for complete search history.

(56) References Cited

U.S. PATENT DOCUMENTS

| 8,478,768 | B1 | 7/2013 | Pathak et al. | |
| 8,953,472 | B2 | 2/2015 | Di Pietro et al. | |
| 9,992,379 | B2* | 6/2018 | Amichai | G06F 11/366 |
| 2004/0193915 | A1* | 9/2004 | Smith | H04L 63/1408 726/22 |
| 2008/0117295 | A1 | 5/2008 | Ebrahimi et al. | |
| 2008/0134294 | A1* | 6/2008 | Mattox | H04L 63/10 726/4 |
| 2008/0198159 | A1 | 8/2008 | Liu et al. | |
| 2009/0193055 | A1 | 7/2009 | Kuberka et al. | |
| 2011/0225200 | A1* | 9/2011 | Danis | G06Q 10/10 707/783 |

(Continued)

OTHER PUBLICATIONS

Shankar, U. et al., "Doppelganger: Better Browser Privacy Without the Bother," In Proceedings of the 13th ACM conference on Computer and communications security, Oct. 30, 2006, pp. 154-167, Alexandria, Virginia, USA.

Primary Examiner — Luu T Pham
Assistant Examiner — Canh Le
(74) Attorney, Agent, or Firm — Daniel Morris; Otterstedt, Wallace & Kammer, LLP (57) ABSTRACT A method of operating a mobile device includes displaying a user interface as an image, the user interface being composed of a plurality of widgets, storing a privacy policy identifying at least one of the widgets, capturing a screenshot image corresponding to the screenshot image, excluding the at least one of the widgets from the screenshot image to create a modified screenshot image, and transmitting the modified screenshot image over a network to a monitoring server.

15 Claims, 8 Drawing Sheets (56) References Cited

U.S. PATENT DOCUMENTS

| | | | |
|---|---|---|---|
| 2012/0317549 A1* | 12/2012 | Cunningham | G06F 11/3612 717/127 |
| 2014/0026182 A1* | 1/2014 | Pearl | H04L 63/20 726/1 |
| 2014/0201844 A1 | 7/2014 | Buck | |
| 2016/0182299 A1* | 6/2016 | Polinati | H04L 67/1061 709/220 |
| 2017/0085591 A1* | 3/2017 | Ganda | H04L 63/20 |

* cited by examiner

PRIVACY-PRESERVING USER-EXPERIENCE MONITORING

BACKGROUND

The present disclosure relates to the preservation of privacy in mobile applications, and more particularly, to the preservation of privacy in monitored applications.

Customers demand mobile applications that are responsive, easy to use and intuitive. While significant effort goes into designing and testing the user interfaces of mobile applications, in many cases problems and usability issues do not become apparent until the application has been deployed. These issues can occur despite best efforts used during the implementation and testing phases of application development. Collecting actual behavior of the application following its deployment is important to the application's overall success with customers.

Currently, customer analytics platforms exist for providing digital customer experience management and customer behavior analysis solutions. One example is TEALEAF, which is a customer experience management solution to help companies meet online conversion and customer retention objectives. One goal of these systems is to determine how users or customers are interacting with a given product.

BRIEF SUMMARY

According to an exemplary embodiment of the present invention, a method of operating a mobile device includes displaying a user interface as an image, the user interface being composed of a plurality of widgets, storing a privacy policy identifying at least one of the widgets, capturing a screenshot image corresponding to the screenshot image, excluding at least one of the widgets from the screenshot image to create a modified screenshot image, and transmitting the modified screenshot image over a network to a monitoring server.

According to an exemplary embodiment of the present invention, a computer network includes a mobile device running an application capturing and modifying a screenshot image using a privacy policy to generate a modified screenshot image, a computer network, and a monitoring server in signal communication with the mobile device over the computer network, wherein the monitoring server provides the privacy policy to the mobile device and receives the modified screenshot image from the mobile device, and wherein the privacy policy identifies a plurality of widgets of a user interface to be excluded from the screenshot image.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

address the issue of user privacy and sensitive information in monitored applications, and enable customizable privacy policies that can be created/updated without requiring the application to be altered.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to one or more embodiments of the present invention, an application running on a mobile device is configured to capture one or more screenshot images during ongoing use of the application. According to an embodiment of the present invention, the application includes code causing the mobile device to capture the screenshot images and gather state information about user interface (UI) elements within the running application (e.g., visible in the context of the application). A privacy policy stored on the mobile device is used to identify and exclude certain widgets from the screenshot images, thereby causing the mobile device to generate modified screenshot images. These modified screenshot images can be communicated to a monitoring server to assess usability of the mobile application or for other purposes.

The UI elements, including buttons, sheets, controls, text boxes, containers, etc., are referred to as widgets for the remainder to the disclosure. These UI elements are not intended to be limiting, and other UI elements, now known and yet to be developed, are to be considered widgets in the context of this disclosure.

According to at least one embodiment, a mobile application's code is augmented with additional code that is called upon to capture a screenshot image while selectively excluding information from the screenshot image, by omission or removal, according to a privacy policy associated with the application and/or the mobile device. The additional code can be implemented as, for example, a toolkit, a library/software development kit (SDK), or the like.

In the case of the library/SDK implementation, the privacy preserving functionality is added to the mobile application as logic in the form of a library/SDK. The library/SDK creates screenshot images contemporaneously with metadata about one or more widgets captured in the screenshot image, including their positions, sizes, and identifications. The metadata facilitates widget identification. Further, the metadata can be used in the creation of a privacy policy, for example, by identifying widgets according to their parameters (e.g., location, size, function, etc.).

According to an embodiment of the present invention, the additional code further causes the mobile device to communicate with a monitoring server, sending the modified screenshot images to the server. In at least one embodiment, user privacy expectations are met or exceeded by limiting information sent to the monitoring server by the mobile device, e.g., wherein the mobile device captures only a portion of a user interface, excluding one or more fields or areas of the user interface from a screenshot image.

According to an embodiment of the present invention, the monitoring server or another server can update, modify, or replace the privacy policy. For example, the mobile device, when communicating with the monitoring server, can receive a new or updated privacy policy. According to an embodiment of the present invention, a remote application (e.g., running on a server remote from the mobile device) is configured to create the privacy policy.

While one or more embodiments of the present invention concern a mobile device running an application to perform certain technological acts, these and other embodiments can be implemented using a cloud architecture, such as the implementation of the monitoring server, which receives and sends data to the library. As such, a description of cloud computing follows.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
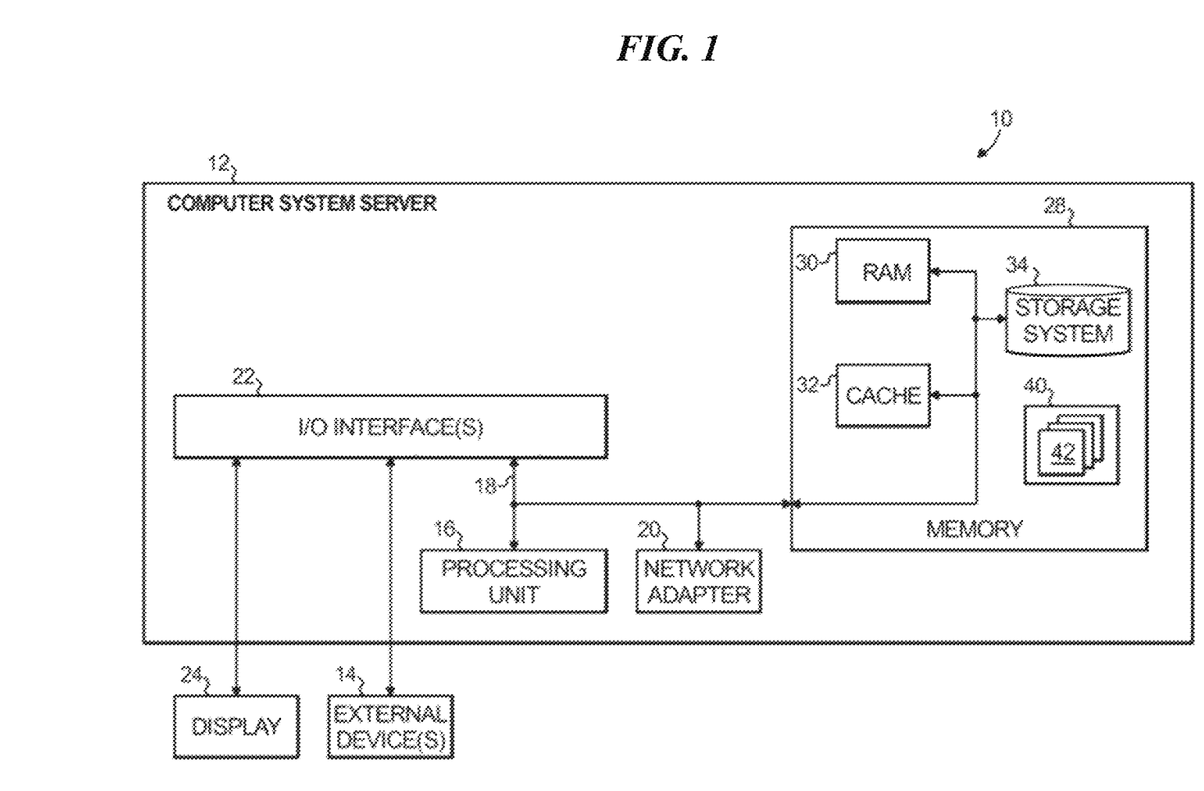
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
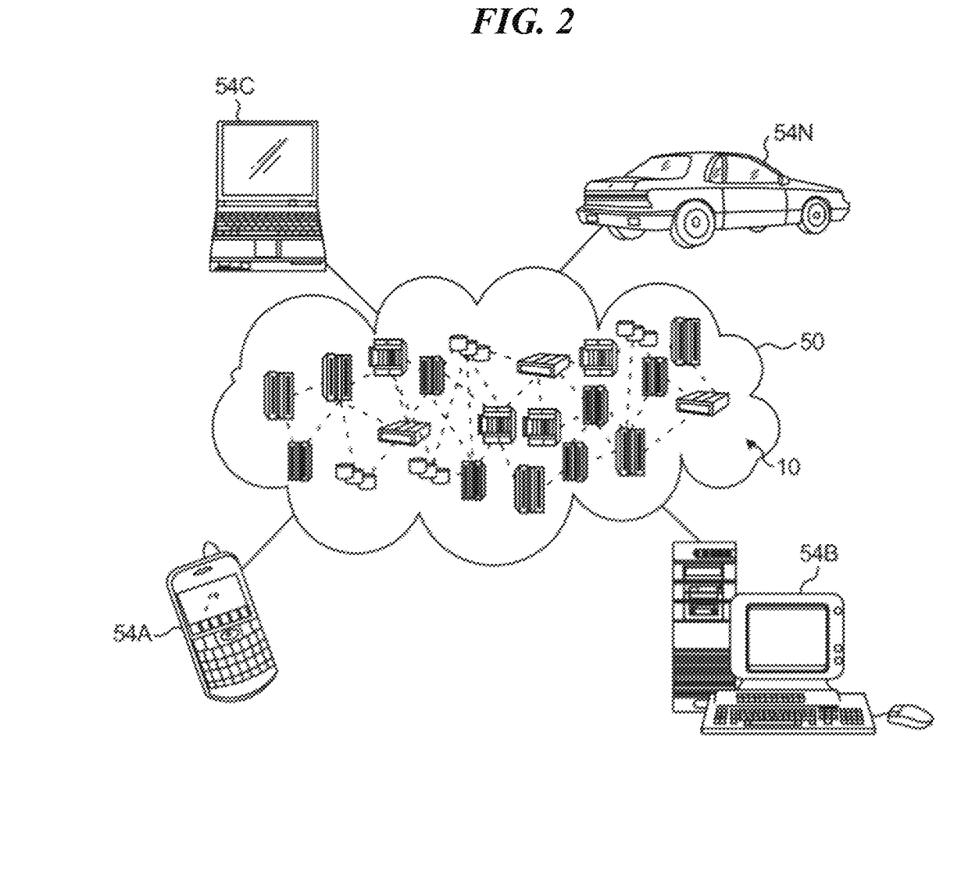
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
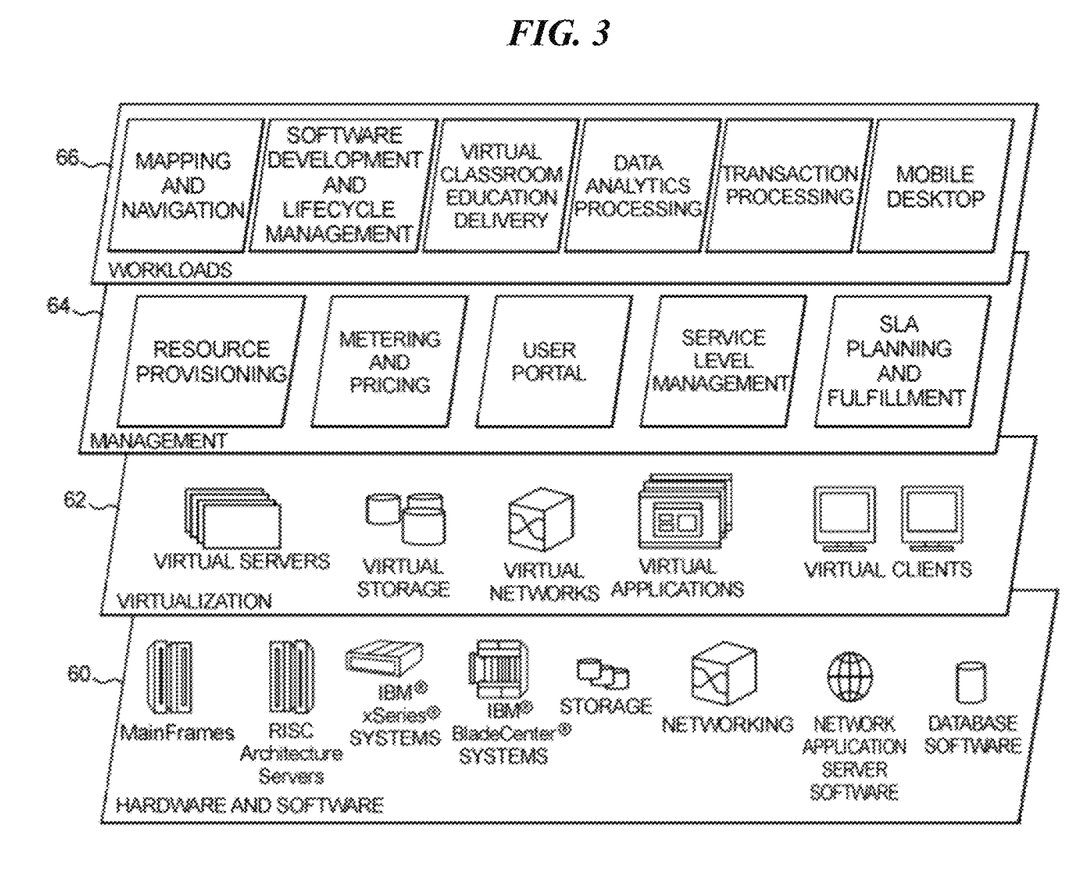
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

A mobile application, or app, is a software program executable by a mobile device such as a smartphone, tablet or music player. Mobile applications can exist in one or a variety of states. For example, a currently executing and visible application (i.e., in the foreground) is said to be the active, visible or foreground application. Other applications can be executing, but not visible, and are considered background applications. Still other applications can be in the background, but not executing, and are considered suspended or empty applications. While these definitions are provided for a general overview of applications states, it should be understood that additional states can be used, for example, in the case where an operating system supports multiple visible applications, which can be prioritized.

Figure 4:
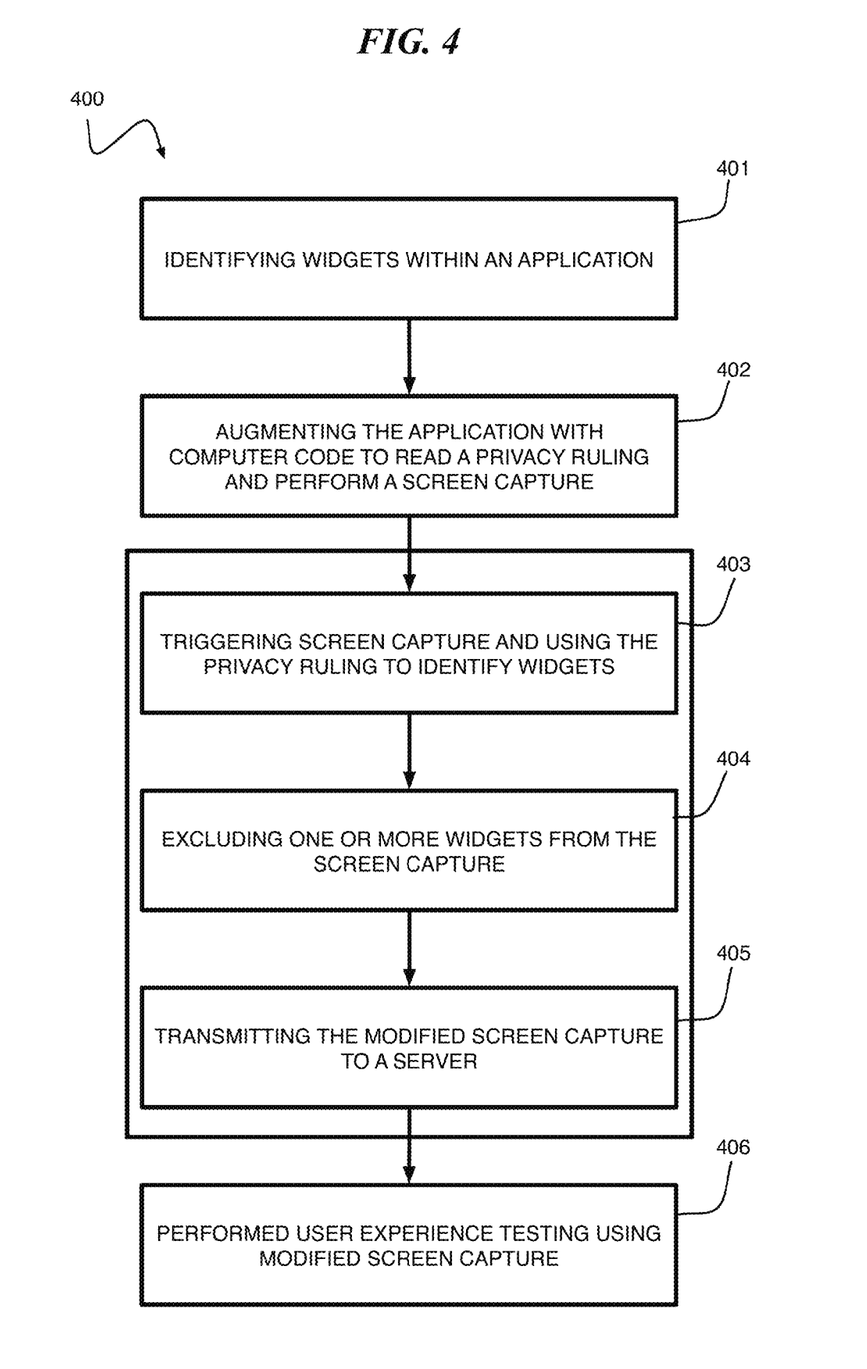
FIG. 4 is a flow diagram of a method for monitoring an application while preserving user privacy according to an embodiment of the present invention.

Referring to FIG. 4, according to an embodiment of the present invention, a method (400) for gathering screenshot images and state information about a mobile device includes identifying widgets within an application (401). Unique identifiers enable the widgets to be identified at runtime in the application. Examples of identifiers include, but are not limited to, an identification (id) field assigned to a widget object, a tag field, an XPath like expression locating the widget, e.g., BookingActivity→Root Container→3rd Container→2nd Container→4th Button, and combinations of the aforementioned identifiers.

In the case of the identification field example, this can be an identification field of a widget system. The identification field can be an integer type field (e.g., numeric). In such a case, a platform (e.g., operating system) provides a method such as "Widget object=getWidgetById(int id)" that can be used to directly obtain a widget object, e.g., an edit box instance, by id.

In the case of the tag field example, a platform supports user defined data included in each widget. The user defined data, used as a tag field, can include, for example, a complex object by reference or a simple string tag. That is, the user defined data can be used as a means of identification. The tags in this case are created to be unique for the widgets so they can be referenced or located via their unique tag values.

In the case of an expression based identifier example, a widget, such as a button, can be referred to using directions or a path. For example, an expression can identify the button as part of the screen for the BookingActivity example given above, which navigates to a particular button in a user interface. Typically, widgets are placed directly in the UI or in another container in the UI, which is a special type of widget that can have, and lay out, other widgets inside it, for example, to arrange a row of buttons. A screen typically has a container at a root, such that widgets can be placed in it or other containers.

According to one or more embodiments of the present invention, these user interface elements are limited to user interface elements that have at least one capability to display user data, e.g., in textual form or in image form. In the present disclosure, sensitive and/or private data is called user data. The user data can be data that is sensitive, e.g., credit card numbers, identifying information, demographic information, etc. In one or more implementations, the user data can be data that an entity controlling the monitoring server does not want to view or that would expose the entity to additional obligations, e.g., enterprise sensitive data, health case data, etc. For example, a healthcare related application can be deployed in a company infrastructure, wherein the company wants to monitor the application to potentially improve its functionality, but the company does not want to be exposed to healthcare data that the user of the application might view.

According to an embodiment of the present invention, a privacy policy is created for the application that enumerates and uniquely identifies each the widgets. Widgets that are to be excluded can be identified in the privacy policy.

According to an embodiment of the present invention, the application is augmented with additional code to read the privacy policy and capture screenshot images in accordance with this policy(402). The augmentation can be performed at development time or after the application has been developed.

At development time a developer uses a library/SDK tool that augments the application with privacy preserving functionality. Alternatively after the application is developed, application wrapping techniques can instead be used to inject the library/SDK into the application. The creation of a privacy policy is described separately herein.

In FIG. 4, blocks 403-405 represent steps performed by a mobile device running an application augmented with privacy preserving functionality and a privacy policy.

One or more widgets that can potentially display sensitive data are listed in the privacy policy. The contents of these widgets are excluded in the screenshot image communicated to the monitoring server, i.e., the modified screenshot image. The additional code of the application controls the capture of screenshot images using the privacy policy to identify and exclude any widgets listed in the privacy policy (403). While following techniques are examples of how this can be accomplished, the present invention is not limited to these techniques.

According to an embodiment of the present invention, after the user interface has been laid out and before any screenshot image is captured, the currently displayed widgets that are configured to display user data are identified using the privacy ruling (403). According to an embodiment of the present invention, the identified widgets are excluded (e.g., omitted, occluded or removed from a screenshot) during any screen capture to generate a modified screenshot image (404). That is the modified screenshot image is a screenshot image in which the widgets identified in the privacy policy have been excluded.

In one example, the identified user interface elements are made fully transparent. In another example, the identified user interface elements are obscured to remove them from view without affecting the layout. In yet another example, the additional code determines whether a widget in the privacy policy contains data, wherein the additional code is configured to either ignore the privacy policy in the case of a lack of user data or exclude the widget regardless of whether user data is displayed. The logic of the additional code that manages the exclusion recognizes the presence of user data and only excludes the widget in a case of a visible manifestation of the user data in the sensitive widget.

It should be understood that any changes to the display image made during a screen capture are reversed after the screenshot image is captured. According to at least one embodiment of the present invention, a widget set that is being used to create the user's display is modified, whereupon the platform (e.g., operating system) is used to render the widgets to an offscreen image using the privacy policy. Once the screenshot image is captured, the modified widgets are restored to their original state. In this example, the physically displayed image (i.e., the image displayed to the user) is not directly modified.

According to an embodiment of the present invention, in a case where the displayed image is modified using the privacy policy prior to capturing the screenshot image, the mobile device, reading the privacy policy, makes temporary changes to the widgets used to render the displayed image (e.g., the displayed screen), captures the screenshot image, and reverts to the widgets to their prior state and hence the previously displayed image. In at least one embodiment, this process results in a brief change in the displayed image, sufficient for the application and/or operating system of the mobile device to capture the screenshot image, before the previously displayed image is restored. According to an embodiment of the present invention, after the user interface has been laid out and before any image is captured, the bounds of identified widgets are determined. The identified widgets are left alone at this stage and the image of the screen is captured. After the capture, the image may still contain user data. According to an embodiment of the present invention, utilizing the recorded bounds information about the identified widgets, the image can be altered to obscure the identified widgets, e.g., by altering the color of the original pixels (404).

According to an embodiment of the present invention, screen captures can be triggered manually or automatically upon the occurrence of certain events. For example, a screen capture can be triggered when an application is made active, just before a switch is made to a new screen of the application, in response to a change within a currently displayed screen. According to an embodiment of the present invention, automatic triggers can be configured to be active based on certain parameters, such as current connectivity of the user device (e.g., available bandwidth, availability of a WiFi signal, etc.), battery level, time of day, etc. In at least one example, the screen capture function is performed only in cases where it does not detract from the user experience of the application.

According to an embodiment of the present invention, captured images and state information are communicated from the user device to a monitoring server (405). For example, the modified screenshot image can be sent via the Internet to the monitoring server along with other user experience monitoring data (e.g., location, network state, date/time, etc.).

According to an embodiment of the present invention, the monitoring server receives and stores the captured screenshot images, making them available for analysis. For example, the captured screenshot images can be used to solve an issue that the user has experienced while using an application.

According to an embodiment of the present invention, the monitoring server can change the privacy policy be replacing or updating the privacy policy implemented by the additional code of the application running on the mobile device. Thus, the monitoring server can ensure that sensitive data does not appear in the modified screenshot images communicated by the mobile device as part of the user experience monitoring system. According to an embodiment of the present invention, the privacy policy can be securely updated by sending the deployed application instances a new version to the mobile device allowing widgets to be added to, or removed from, the privacy policy. The suppression of user data in the modified screenshot images can be controlled through the privacy policy without altering any code of the application or the additional code.

According to an embodiment of the present invention, once the application on the mobile device has a privacy policy and has been augmented to capture screenshot images at runtime, it can be deployed to customers. According to an embodiment of the present invention, modified screenshot images captured by the mobile devices are used for user experience debugging and problem assistance/resolution performed at a monitoring server.

Figure 5A:
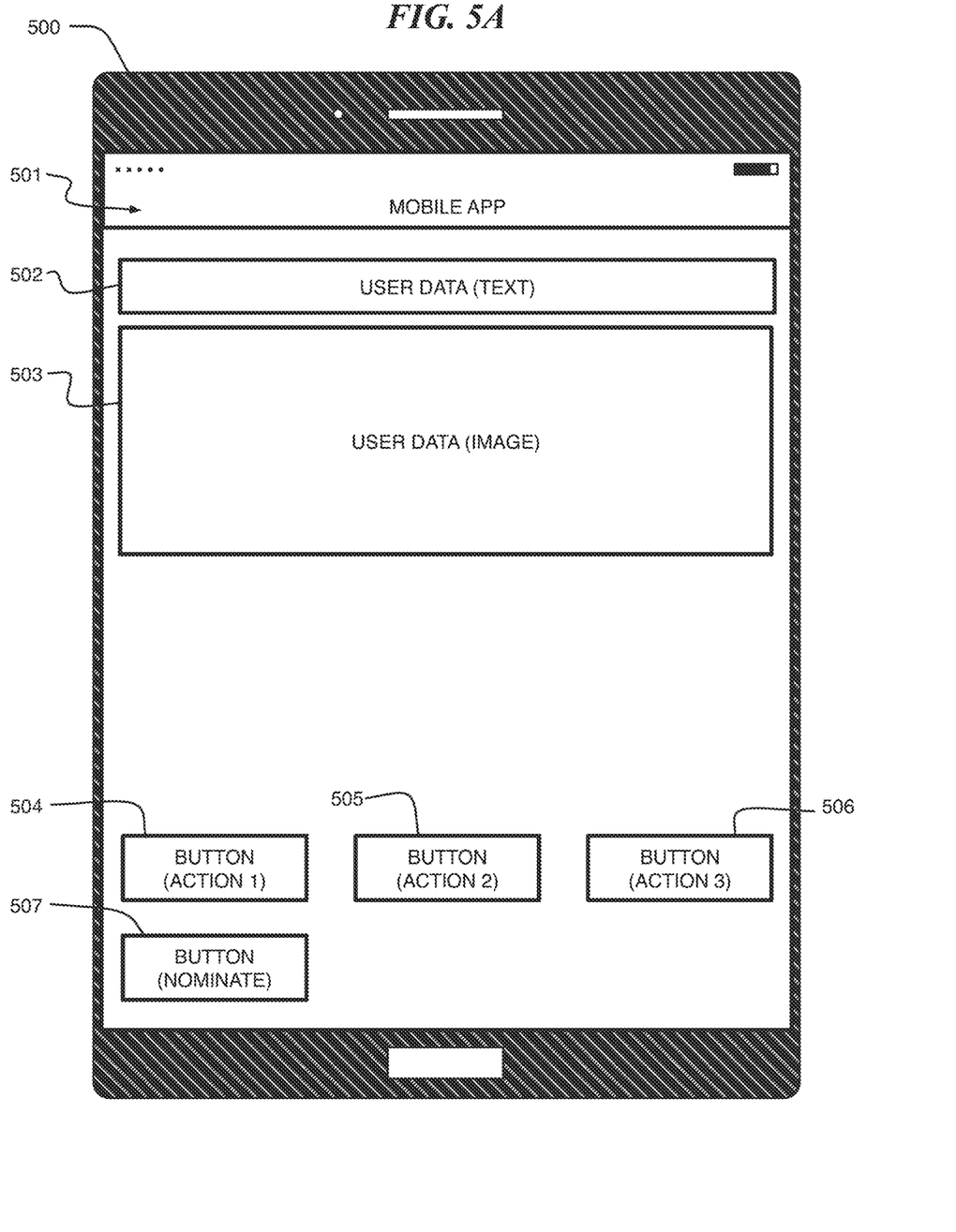
FIG. 5A is a view of a mobile device having a display screen according to an embodiment of the present invention.
Figure 5B:
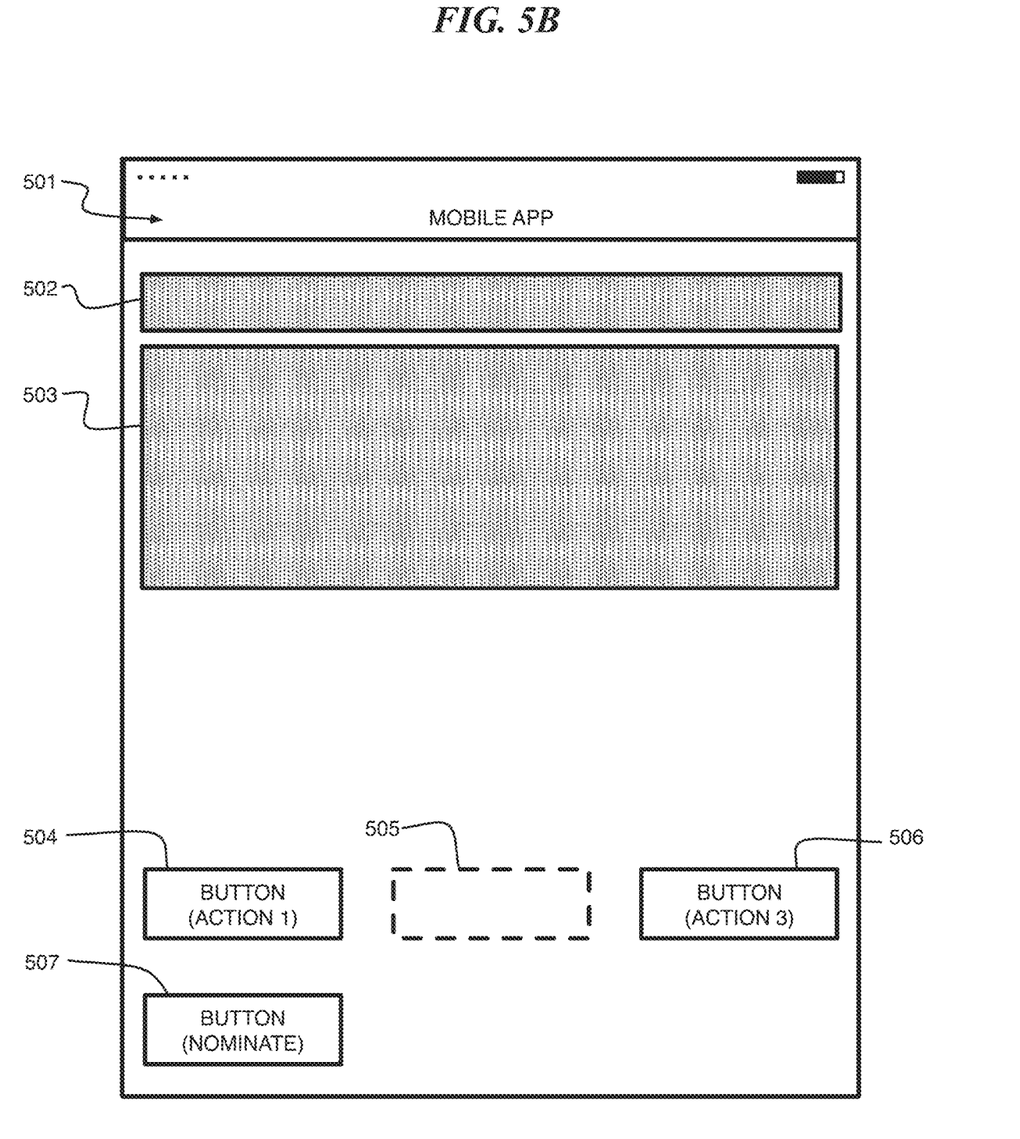
FIG. 5B is a view of a mobile device having a modified screen capture image illustrating privacy protection features according to embodiments of the present invention.

FIGS. 5A-B show a mobile device 500 displaying an application UI 501. FIG. 5A shows the application UI 501 including a text box 502 including user text data, a field showing user image data 503 and three control buttons 504-506.

In FIG. 5B, a modified screenshot image (e.g., captured by a mobile device and communicated to a monitoring server) is illustrated, wherein the text box 502 and the field showing the user image data 503 are occluded. Furthermore, the button 504 has been made transparent, such as in the case where the mere presence of the button could reveal user data (e.g., an available action that reveals some information about the user).

According to an embodiment of the present invention, the mechanism for removing user data (e.g., obscuring data with a mask, changing transparency, etc.) from captured images is controlled by the privacy policy. For example, a mask can be selected to overlay an identified location of a widget in any captured image. A privacy policy can allow different user interface elements to be hidden by different mechanisms within the same user interface as applicable/desirable. According to an embodiment of the present invention, a method specified by a privacy policy overrides another method (e.g., a default method) of removing user data.

Whether the images are screenshots that are taken at defined and/or periodic intervals, and sent as images, or the images are combined as individual frames into a video that captures the user experience, the same techniques can be applied.

According to an embodiment of the present invention, at least one widget 507 enables a user of the mobile device to nominate a widget whose data is to be suppressed. For example, upon the selection of the nomination button 507, the application communications a next selected widget to the monitoring server as a nominated widget. Other methods of nominating widgets can be used. For example, according to at least one embodiment of the present invention, a captured screenshot image and its metadata are displayed by the application to the user, enabling the user to pick a widget and affect the privacy policy. In at least one embodiment, the nominate button 507 puts the application into a privacy policy modifier mode, where clicking on a widget in the user interface element affects the privacy policy. This functionality enables the end-user to control what widgets are monitored where it might be applicable/reasonable to do so.

Figure 6:
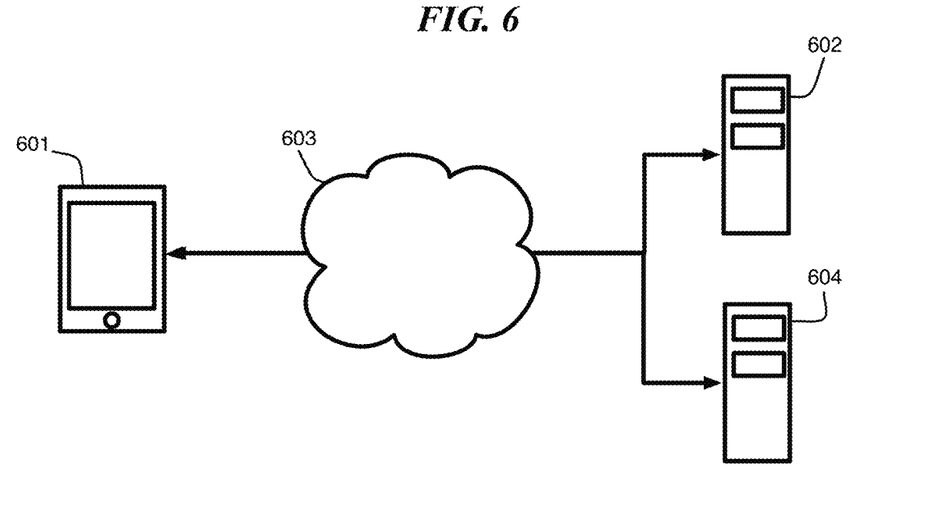
FIG. 6 is a view of a network connecting a mobile device to a monitoring server according to an exemplary embodiment of the present invention.

FIG. 6 depicts a mobile device 601 communicating with a monitoring server 602 across a computer network 603, such as the Internet. Furthermore, a developer server 604 is disposed in signal communication with the mobile device 601 to, for example, deploy applications, updates to privacy policies and the like. Additional computer nodes can be disposed in the computer network 603, such as app store servers and the like.

Privacy Policy Creation:

According to an embodiment of the present invention, tooling code can be used to create a privacy policy. An initial privacy policy is created during an application development process. The widget identification and creation of the privacy policy file (e.g., a plurality of widgets) can be performed entirely manually or assisted by a user-interface (UI) layout builder. In the case of an assisted implementation, a custom plugin for an integrated development environment (IDE) enables a developer, privacy expert, etc., to create a privacy policy identifying certain widgets used by the application/graphical user interface (GUI) to be excluded from any screenshot images captured as part of an operation of the monitoring server. In at least one embodiment, a UI can be shown in a design panel used by the developer, and one or more widgets are selected/chosen for inclusion in the privacy policy.

According to at least one embodiment, the tooling code can be in the form an SDK/library added to the application either by a developer or by injection (i.e., application wrapping). The library/SDK for creating the privacy policy assists in the identification of widgets and the creation of the privacy policy. According to an embodiment of the present invention, the SDK/library for creating a privacy policy includes logic similar to that of the privacy capture SDK/library in the deployed application to be monitored. According to an embodiment of the present invention, this library/SDK for creating the privacy policy is configured to capture one or more views of the display of user device (screenshot images) as the application runs. Each screenshot image includes a map of the location of each widget in the image. The state data can include hierarchical relationships between the widgets. According to an embodiment of the present invention, the SDK/library for creating the privacy policy includes functionality for sending data (e.g., unmodified screenshot image, metadata, etc.) enabling another application to display the unmodified screenshot image with hotspots over any widget by use of the metadata, and allow the privacy policy to be created by selecting the hotspots corresponding to certain widgets. For purposes of creating a privacy policy, a special build of the application can be created including the SDK/library for creating the privacy policy to facilitate the privacy policy creation.

According to an embodiment of the present invention, in a case of an application developed by a third party, users' experiences can be monitored by injecting the library/SDK for creating the privacy policy into the application. The library/SDK for creating the privacy policy enables all screens to be captured so that widgets can be located. The library/SDK for creating the privacy policy captures the screenshot images, the widget hierarchy, and any identifications or tags that the widgets might have. The widgets can then be identified by an identification or tag if it exists, or by a path down to the widget's position (e.g., by an xpath like expression).

According to an embodiment of the present invention, a privacy policy tool is provided (e.g., at the monitoring server or another server) to create the privacy policy. According to an embodiment of the present invention, the privacy policy tool identifies widgets using scene graphs (e.g., hierarchical relationships in a container/widget hierarchy) captured from the application. The hierarchical relationships can be used when forming xpath like expressions. The application can be run on the monitoring server or another computer system to collect screenshot images and create the privacy policy. The privacy policy can then be deployed to the mobile device(s) via the Internet or another computer network.

Recapitulation:

According to an exemplary embodiment of the present invention, a method of operating a mobile device includes displaying a user interface as an image, the user interface being composed of a plurality of widgets, storing a privacy policy identifying at least one of the widgets, capturing a screenshot image corresponding to the screenshot image, excluding at least one of the widgets from the screenshot image to create a modified screenshot image, and transmitting the modified screenshot image over a network to a monitoring server.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for preserving user privacy in mobile applications. Further, a computer program product can include a tangible computer-readable recordable storage medium with code adapted to be executed to carry out one or more method steps described herein, including the provision of the system with the distinct software modules.

Figure 7:
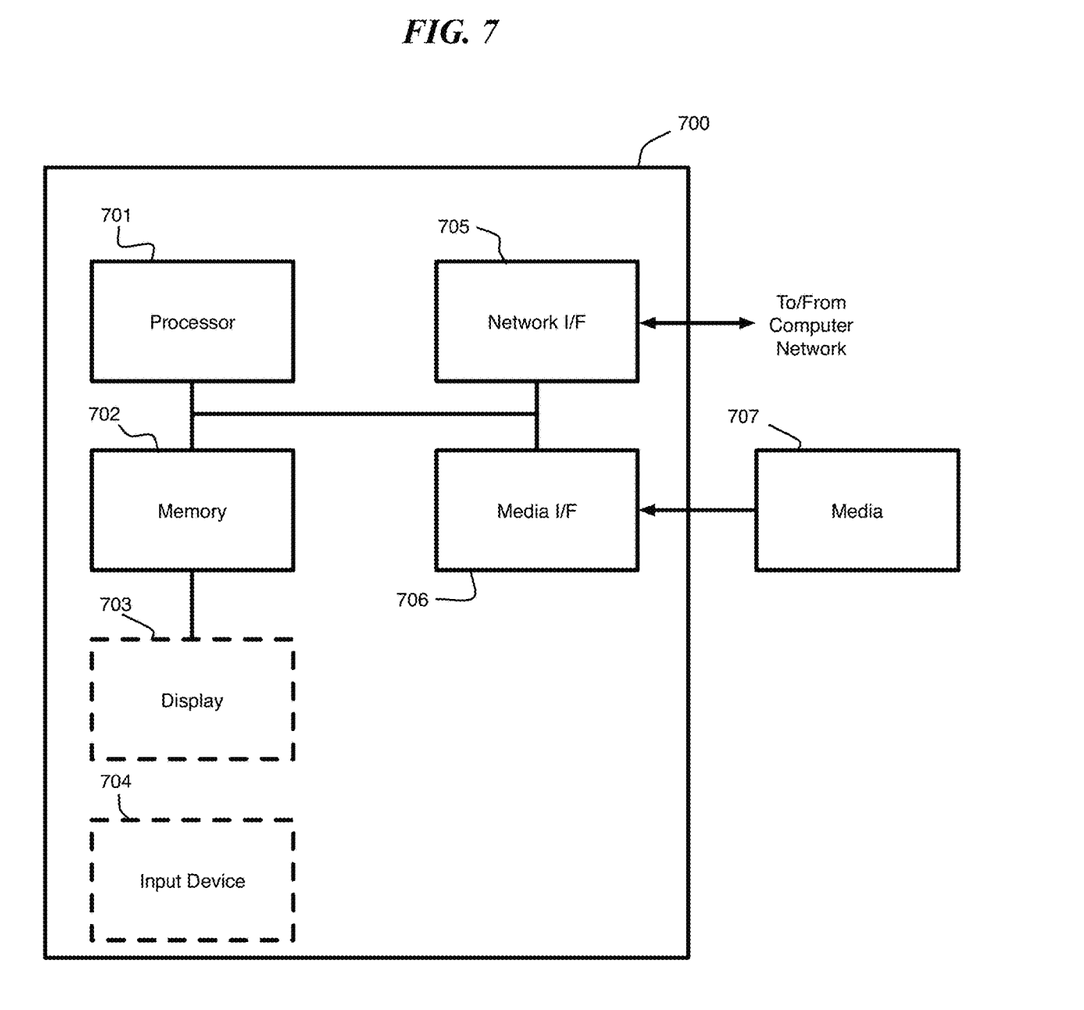
FIG. 7 is a block diagram depicting an exemplary computer system embodying a method of privacy preserving application monitoring according to an exemplary embodiment of the present invention.

Referring to FIG. 7; FIG. 7 is a block diagram depicting an exemplary computer system 700 embodying the computer system for preserving user privacy in mobile applications (see FIG. 4) according to an embodiment of the present invention. The computer system shown in FIG. 7 includes a processor 701, memory 702, display 703, input device 704 (e.g., keyboard), a network interface (I/F) 705, a media I/F 706, and media 707, such as a signal source, e.g., camera, Hard Drive (HD), external memory device, etc.

In different applications, some of the components shown in FIG. 7 can be omitted. The whole system shown in FIG. 7 is controlled by computer readable instructions, which are generally stored in the media 707. The software can be downloaded from a network (not shown in the figures), stored in the media 707. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present invention can be implemented as a routine that is stored in memory 702 and executed by the processor 701 to process the signal from the media 707. As such, the computer system is a general-purpose computer system that becomes a specific purpose computer system when executing routines of the present disclosure.

Although the computer system described in FIG. 7 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a computing device comprising:
    displaying a user interface on a display of said computing device, said user interface being composed of a plurality of widgets;
    storing a privacy policy identifying at least one of said widgets;
    detecting that a screen capture has been triggered;
    changing said user interface displayed by excluding said at least one of said widgets from said user interface in response to detecting that said screen capture has been triggered and according to said privacy policy;
    capturing a screenshot image of a changed user interface in which said at least one of said widgets is excluded from being displayed on said display of said computing device; and
    transmitting said screenshot image over a network to a monitoring server.

2. The method of claim 1, further comprising running an application in said computing device, said application including program instructions causing said computing device to display said user interface, detect that said screen capture has been triggered, display said changed user interface excluding said at least one of said widgets, capture said screenshot image of said changed user interface and transmit said screenshot image.

3. The method of claim 1, wherein excluding said at least one of said widgets comprises at least one of omitting a portion of said user interface corresponding to said at least one of said widgets at a time of said capture of said screenshot image, occluding a portion of said user interface corresponding to said at least one of said widgets at said time of said capture of said screenshot image, and removing a portion of said user interface corresponding to said at least one of said widgets at said time of said capture of said screenshot image.

4. The method of claim 1, further comprising receiving data from a server causing said computing device to perform one of updating said privacy policy, modifying said privacy policy, and replacing said privacy policy.

5. The method of claim 1, further comprising recording metadata about said at least one of said widgets contemporaneously with said capture of said screenshot image.

6. The method of claim 1, further comprising:
    receiving a selection of a widget not identified in said privacy policy; and
    updating said privacy policy to include said widget not identified in said privacy policy.

7. A non-transitory computer program product comprising a computer readable storage medium having program instructions embodied therewith, said program instructions executable by a processor to cause the processor to:
    display a user interface on a display of said non-transitory computer program product, said user interface being composed of a plurality of widgets;
    store a privacy policy identifying at least one of said widgets;
    detect that a screen capture has been triggered;
    change said user interface displayed by excluding said at least one of said widgets from said user interface in response to detecting that said screen capture has been triggered and according to said privacy policy;
    capture a screenshot image of a changed user interface in which said at least one of said widgets is excluded from being displayed on said display of said computing device; and transmit said screenshot image over a network to a monitoring server.

8. The non-transitory computer program product of claim 7, wherein said program instructions executable by said processor to cause said processor to exclude said at least one of said widgets from said screenshot image further comprises program instructions executable by said processor to cause said processor to omit from said displayed user interface a portion of said user interface corresponding to said at least one of said widgets at a time of said capture of said screenshot image.

9. The non-transitory computer program product of claim 7, wherein said program instructions executable by said processor to cause said processor to exclude said at least one of said widgets from said screenshot image further comprises program instructions executable by said processor to cause said processor to occlude in said displayed user interface a portion of said user interface corresponding to said at least one of said widgets at a time of said capture of said screenshot image.

10. The non-transitory computer program product of claim 7, wherein said program instructions executable by said processor to cause said processor to exclude said at least one of said widgets from said screenshot image further comprises program instructions executable by said processor to cause said processor to remove a portion from said displayed user interface of said user interface corresponding to said at least one of said widgets at a time of said capture of said screenshot image.

11. The non-transitory computer program product of claim 7, further comprising program instructions executable by said processor to cause said processor to receive data from a server updating said privacy policy.

12. The non-transitory computer program product of claim 7, further comprising program instructions executable by said processor to cause said processor to receive data from a server modifying said privacy policy.

13. The non-transitory computer program product of claim 7, further comprising program instructions executable by said processor to cause said processor to receive data from a server replacing said privacy policy.

14. The non-transitory computer program product of claim 7, further comprising program instructions executable by said processor to cause said processor to record metadata about said at least one of said widgets contemporaneously with said capture.

15. The non-transitory computer program product of claim 7, further comprising program instructions executable by said processor to cause said processor to:
receive a selection of a widget not identified in said privacy policy; and
updating said privacy policy to include said widget not identified in said privacy policy.

* * * * *